United States Patent [19]

Reinecke

[11] Patent Number: 4,674,326
[45] Date of Patent: Jun. 23, 1987

[54] APPARATUS FOR THE MEASURING AND/OR CONTROLLING OF THE WEAR ON A COMPONENT

[75] Inventor: Erich Reinecke, Burgdorf, Fed. Rep. of Germany

[73] Assignee: Wabco Westinghouse Fahrzeugbremsen GmbH, Hanover, Fed. Rep. of Germany

[21] Appl. No.: 816,500

[22] Filed: Jan. 6, 1986

[30] Foreign Application Priority Data

Jan. 23, 1985 [DE] Fed. Rep. of Germany ....... 3502052

[51] Int. Cl.$^4$ .............................................. G01L 5/28
[52] U.S. Cl. .......................................... 73/129; 73/7; 188/1.11
[58] Field of Search ............................. 73/121, 129, 7; 340/52 A, 52 B, ; 188/1.11; 374/142; 303/20; 364/426

[56] References Cited

U.S. PATENT DOCUMENTS

| 3,975,706 | 8/1976 | Kato | 340/52 A |
| 4,402,047 | 8/1983 | Newton et al. | 303/20 X |
| 4,520,663 | 6/1985 | Moore et al. | 73/129 |

FOREIGN PATENT DOCUMENTS

| 3324865 | 5/1984 | Fed. Rep. of Germany . |
| 3319988 | 8/1984 | Fed. Rep. of Germany . |
| 3345694 | 6/1985 | Fed. Rep. of Germany . |
| 1548535 | 10/1968 | France . |
| 2393196 | 12/1978 | France . |
| WO/8400407 | 2/1984 | PCT Int'l Appl. . |

Primary Examiner—Jerry W. Myracle
Attorney, Agent, or Firm—J. B. Sotak

[57] ABSTRACT

An improved arrangement for measuring and controlling the wear of the first member which is subject to wear during frictional contact with the second member. The unique arrangement employs a simple process which allows a direct measurement of wear with a minimum expenditure. The invention involves a method of measuring the temperature which is generated in the first member or in the second member or in an adjacent member, which is representative of the above-mentioned wear which occurs during frictional contact, and an evaluation circuit for converting the temperature values into wear signals.

13 Claims, 1 Drawing Figure

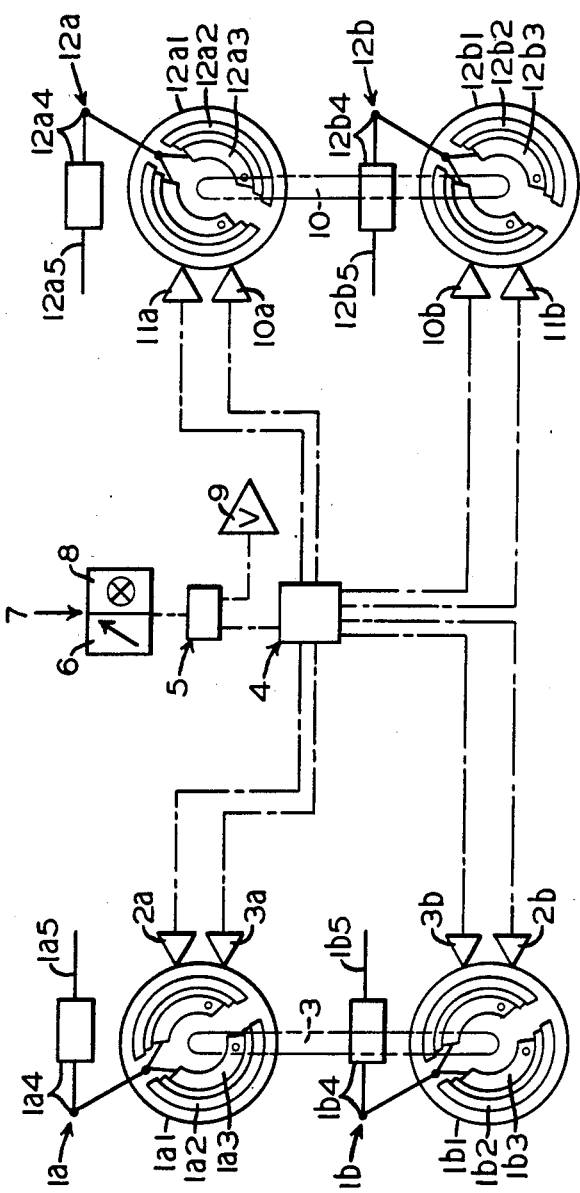

APPARATUS FOR THE MEASURING AND/OR CONTROLLING OF THE WEAR ON A COMPONENT

FIELD OF THE INVENTION

This invention relates to an arrangement for measuring and/or controlling the amount of wear occurring on a first member when it comes into frictional sliding contact with a second member and, more particularly, to a braking system for motor vehicles in which, the amount of wear on a frictional engaging member is determined by measuring the temperature rise of the member and converting the temperature value into a wear signal.

BACKGROUND OF THE INVENTION

The published German Patent Application DE No. 33 00 446 A1 shows and discloses a prior type of braking system for measuring the amount of wear of a brake lining, which is considered the first member, which is worn as a result of frictional contact with a brake drum or brake disc, which is considered the second member, during the actuation stroke of a brake cylinder. In order to measure the wear of the brake lining, the prior art proposes measuring the minimum stroke of the brake cylinder. The signal, which is a function of the wear, increases to the minimum brake cylinder stroke and is evaluated over a number of brake applications.

With this solution, the wear parameter is monitored by a component, namely, the brake cylinder, which is not involved at all in the wear process. The determination of wear is therefore indirectly made. The measurement sensor required for the brake cylinder for this purpose, along with its mounting elements and the related modifications to the brake cylinder, results in a considerable complex and expensive arrangement.

OBJECTS AND SUMMARY OF THE INVENTION

An object of this invention, therefore, is to provide an improved, simple means in place of the apparatus described above, so that it is possible to make a direct, uncomplicated, and economical measurement of wear.

Another object of this invention is to provide an arrangement for measuring and controlling the amount of wear of the first member, which is worn during frictional contact with the second member comprising, at least one measurement element emitting output signals which are a function of the wear and which are fed to an evaluation circuit, the measurement element takes the form of a temperature sensor which is located on the first member which is adjacent to the second member, and the temperature-dependent output signals produced by the temperature sensor are evaluated by the evaluation circuit to provide wear signals indicative of the amount of wear.

During their frictional contact, the first and second members can either come into contact with one another under the action of their own weight or they can be moved together by one or more actuating devices. Specifically, the first member can be pressed against the second member by one or more hydraulic or pneumatic actuating cylinders which may have a fixed or variable pressure force.

Simply stated, the invention utilizes the transformation of heat during the friction work performed by the frictional contact of the above-mentioned members. In other words, the invention proceeds from the theory that the heat absorption properties of the first member, which change with increasing wear (i.e., loss of mass), can be used as a yardstick for determining the amount of wear. The changing heat absorption property of the first member is measurable as a modified thermal behavior of the first or the second member of a combined temperature of both members during or after their frictional contact. In a similar manner, for this purpose, the temperature behavior of a member adjacent to the first member, such as, the support or carrier element on which the first member is mounted, can also be evaluated.

This invention provides the advantage that it furnishes immediate results and that it is not necessary to wait for a series of time-consuming measurements.

In a first comtemplated embodiment, the temperature of the first member itself is monitored. The temperature sensor can thereby be disposed in the first member and/or in the member adjacent to the first member, namely, in a carrier or support element.

In another proposed embodiment, the temperature of the second member is monitored and evaluated. It will be appreciated that the combined temperature of both members can also be measured.

In another anticipated embodiment, the temperature of the adjacent carrier or support member is only monitored. In this embodiment, the temperature sensor is located in or on the adjacent carrier or support member.

When a measurement of the temperatures of the first or second members, and also when the measurement of the above-mentioned combined temperatures are monitored and evaluated, the temperature sensor can also be located in or on the second member. The temperature sensor, as a rule, can be advantageously installed on that member, which remains in a fixed position in relation to the evaluation circuit all during the time of measurement. The temperature signals are conveyed by slip rings and conductors, in which compensation of the conductive leads is taken into consideration.

The temperature measurement is preferably taken during the frictional contact periods. Since, there may be temporary and local dynamic temperature conditions during the frictional contact while the transformation of friction into heat is still in progress, the temperature measurement should take place at apredetermined time after the initial frictional contact is made. This time period can be determined so that the temperature inside the selected member, or inside the members which are subject to the measurements, are equally distributed or have been equalized so that a true representative value can be obtained.

As a rule, the temperature of the first member or its adjacent support member and/or the second contact member will normally result in temperatures which have a tendency to increase with increasing wear. But there are certain embodiments in which, as a result of the decreasing mass of the first member, which is caused by frictional wear, the discharge or conveyance of heat into an adjacent member, such as the support carrier, increases; resulting in a tendency of the temperatures of the first and/or second members to decrease and/or a mixed temperature.

It will be appreciated that in the above-mentioned embodiments, a number of temperature sensors may be located along the length and/or the width of the contact surfaces so that their temperature signal corresponds to the arithmetic or average sum of the signals of the individual temperature sensors. Specifically, the number of temperature sensors, depending on the configuration of the first member and/or of the above-mentioned adjacent member, can be distributed along their length or their circumference and/or their width. If the formation of the temperature signal is based on the average sum of the signals of the individual temperature sensors, the summation can be done so that special emphasis is placed on the formation of the average value. This can be useful or essential if, for example, the temperatures which occur in the vicinity of these temperature sensors are especially representative or particularly dangerous for the material of the first member.

Depending on the embodiment, the standard characteristics of the first member or of the adjacent member and/or of the second member and/or of the combined temperature is stored in the evaluation circuit as a function of the wear status of the first member.

In one embodiment, the stored series of characteristic curves represent the function of the wear status of the first member. Thus, the characteristic curves for the temperatures of the member or members are monitored by the temperature sensors, or their combined temperature as a function of their initial temperature which is the temperature before frictional contact.

If the friction work performed during the frictional contact is likely to change from contact to contact, then the series of characteristic curves must also contain certain parameters representing the friction work performed. Since the friction work performed corresponds to the loss in kenetic energy of the system, consisting of the first member, the second member, any adjacent members, and any other adjacent members, the suitable parameters for the friction work performed can be represented by the masses of the elements of the system as well as the initial and final velocity of the frictional contact.

If, for example, the first member is placed in a fixed position, then the friction work performed can be determined in the known manner from the mass, and the initial and final velocity of the second member.

In an embodiment constructed in accordance with the latter two paragraphs, the signals characterizing the masses and velocity of the inertial masses during the frictional contact, as well as their initial and final velocity, are fed to the evaluation circuit via suitable measurement sensors. The evaluation circuit is designed so that its series of characteristics contain these signals as parameters.

The wear value signals are produced by the evaluation circuit on the basis of the stored characteristics and the stored parameters, as well as the signals fed into it, to control a device which indicates wear and/or to control a device which gives a warning when maximum allowable wear occurs.

If there are a number of groups, with each consisting of at least one first member and a corresponding second member for each group or for each several groups, there can be an individual indicator and/or a warning device whereby, the evaluation circuit for each group includes an individual channel; or only one indicator and/or warning device whereby, the evaluation circuit and/or the indicator and/or the warning device can be switched from one to every other group.

In one embodiment, the first member and the second member form a brake system, specifically a wheel brake on a motor vehicle, wherein the first member is designed as a brake lining which is mounted on an adjacent carrier member, and the second member is designed as the corresponding brake drum or brake disc.

One application of such a brake system is in the field of motor vehicle technology, whereby the brake system can be designed as a hydraulically or pneumatically activated wheel brake. In this case, the indicator and/or the warning device can alert the driver of the vehicle of the wear status or the occurrence of a maximum allowable wear on the brake lining of the wheel brake.

When the invention is used in the field of motor vehicle technology, the temperature sensors may be located on the members and the derived signals characterize the amount of friction work performed. The mass or load signals can be derived, in motor vehicle technology, from at least one of the measurement elements (load sensors) representing the partial loads of the vehicle corresponding to the wheel brake, and the velocity signals from a suitable measurement element (velocity sensor) representing the velocity of the vehicle.

The temperature sensors can also be located on two individual wheel brakes. The evaluation circuit normally includes a comparison and control apparatus, which compares the temperature signals (originating from the temperature sensors corresponding to the wheel brakes), with one another, or with a command value obtained from the series of characteristic curves for controlling the hydraulic or pneumatic pressure of the actuating cylinder. Accordingly, the brake pressure on the various wheel brakes is stabilized in accordance with the temperature signals and thus with the wear of the brake lining, and/or the braking moments of the wheel brakes are controlled relative to one another or to the command value.

In the above-described embodiment, the evaluation circuit can also be designed so that it calculates and stores correction values of the brake pressures, which are to be fed to the various wheel brakes on the basis of the stored characteristics and, if necessary, the stored parameters of the friction work from the temperature signals fed to it (during or after one or more previous brake applications) and regulates the braking pressures, according to the correction values, during a brake application by controlling the pressure control valves.

The correction values in question can advantageously represent a command value or a series of characteristic command values for the difference and/or the portion of the brake pressures which are to be fed to the various wheel brakes; in which case, the evaluation circuit controls the above-mentioned brake pressures according to the command value or to the characteristic command values. The evaluation circuit can thereby be designed so that it updates the correction values, specifically the above-mentioned command value or the series of characteristic command values, on the basis of the temperature signals fed to it during or after the application of the brake, and the load or velocity signals recieved during the application of the brake. It is apparent that the brake pressures are always controlled in this manner, taking the most recent measurement results into consideration.

With the application of the invention in motor vehicle technology, as described above, the temperature measurement can be taken after the conclusion of each application of the brake, whereby the remarks made earlier, concerning the measurement after frictional contact of the components, apply accordingly.

The evaluation circuit can also be designed so that it does not take into consideration the signals of each prior brake activation, but only those from a section of brake applications characterized by specific limiting conditions.

BRIEF DESCRIPTION OF THE DRAWING

The above objects and other attendant features and advantages of the subject detailed description will become more readily apparent by reference to the accompanying drawing, wherein:

The single FIGURE is a schematic illustration of the braking equipment of a motor vehicle.

DETAILED DESCRIPTION OF THE INVENTION

Referring now to the single FIGURE of the drawing, there is shown a schematic diagram of a braking system for the four (4) wheels of a motor vehicle. The various elements having the same function are always identified in the drawing with the postfix "a" for the one side of the vehicle, namely, the right side; and with the postfix "b" for the other side of the vehicle, namely, the left side. It will be understood that the dot-dashed lines in the drawing represent the electrical conductors or connection leads which interconnect the various elementst.

The braking system includes four (4) individual brake assemblies, namely, two (2) front-axle brakes 1a and 1b and two (2) rear-axle brakes 12a and 12b, which are designed as hydraulic drum brakes in the known manner. Each of the brake assemblies 1a, 1b, 12a, 12b includes a brake drum 1a1, 1b1, 12a1, 12b1 and a brake lining 1a1, 1b2, 12a2, 12b2, which is riveted or bonded to the respective carrier plates 1a3, 1b3, 12a3, 12b3. The actuation or operation of each of these wheel brakes is achieved in a conventional manner, in which an associated brake cylinder and mechanical linkage 1a4, 1b4, 12a4, 12b4 effectively apply and release the respective brakes. The fluid brake pressure is conveyed to the brake cylinder through the pressure supply lines 1a5, 1b5, 12a5, 12b5.

As shown, a plurality of temperature sensors for the wheel brakes are identified on the front axle by numerals 2a and 2b and on the rear axle by numerals 11a and 11b, with the corresponding postfix "a" or "b" depicting opposite sides of the vehicle. For the arrangement of the temperature sensors on the members of the wheel brakes, the remarks made above apply, whereby the brake drum is considered the second member and the brake lining is considered the first member, as well as the carrier plate for supporting the braking lining. As mentioned above, each of the wheel brakes includes brake lining designed as the first member, for which the remarks made above and below, in connection with the brake drum and its lining carrier plate, apply in a like manner.

The temperature sensors are shown as individual elements; however, as described above, they can also be combined to produce an average value for a number of individual temperature sensors.

The front axle is designated by numeral 3 while the rear axle is designated by numeral 10. The postfixes "a" and "b" depict the given vehicle side and the corresponding weight sensors which sense the load sustained by the corresponding wheel. Namely, the weight sensor 3a determines the load carried by the right front wheel, while weight sensor 3b measures the load carried ty the left front wheel. Conversely, the weight sensor 10a measures the load carried by the right rear wheel, while the weight sensor 10b senses the weight exerted on the left rear wheel. It will be seen that the switching circuit 4 is carried by the motor vehicle. The switching circuit 4 is connected to each of the temperature and weight sensors. That is, the switching circuit 4 is supplied with signals from each of the temperature sensors 2a, 2b, 11a, 11b of each wheel of the vehicle. An output signal is generated by the switching circuit 4, which is connected with an evaluation circuit 5. The switching circuit 4 operates a selective interrogating device of the temperature and load signals supplied by the sensors corresponding to the condition of the wheel brakes. The switching circuit 4 can be designed to be either manually activated or automatically initiated by a program-controlled switch. A speed signal from a velocity sensor 9 is fed directly to the evaluation circuit 5.

The evaluation circuit 5 is programmed to analyze a series of characteristic curves, which are based on the speed signals supplied by the velocity sensors and the load signals' corresponding weight sensors, as the basic parameters to form a wear value signal which is fed to an integral indicator and warning device 7. The indicator and warning device 7 includes an analog or a digital wear indicator 6, symbolized by an arrow, as well as a warning device 8, symbolized by an alert light. The wear indicator 6 displays the calculated wear signal derived by the wear evaluation circuit 5, which indicates the wear level or the remaining thickness of the brake lining. In the present instance, the warning device 8 emits an optical warning signal if the given level of the wear signals, supplied by the evaluation circuit 5, indicates that a minimum lining thickness has been reached. In addition, it will be appreciated that the indicator and warning device 7 also includes an indicator to ascertain which of the wheel brakes has reached the minimum wear level, and provides a wear value indication or warning signal.

The switching circuit 4 and/or the evaluation circuit 5, as well as the indicator and warning device 7, are equipped with a buffer memory for storing the most recently received signal or indication, so that it is possible to provide an indication and warning signal, as well as evaluating all the sensor units, even when the brakes are not being applied.

The evaluation circuit 5 is designed so that it operates the above-mentioned control or checking processes for equalizing any non-uniformities which are detected in the temperature and/or braking torque. In certain instances, the braking pressures are controlled in accordance with the correction values so that the pressure supply line of each brake cylinder is appropriately controlled. In order to perform this function, there must be a pessure control valve, or the brake application equipment must be provided with the ability of such a pressure control valve.

While it is apparent that the above embodiment relates to a brake system for a motor vehicle, it is understood that the invention has a wide range of other applications.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. An arrangement for measuring the amount of wear occurring on a first member which is worn during frictional contact with a second member comprising, at least one measurement element for generating output signals which are a function of the wear on said first member, said measurement element takes the form of a temperature sensor which is located on said first member and is adjacent to said second member, and an evaluation circuit for evaluating the temperature-dependent output signals produced by the temperature sensor and for providing wear signals indicative of the amount of wear occurring on said first member.

2. The arrangement, according to claim 1, wherein an indicator and a warning device are controlled by the wear signals.

3. The arrangement, according to claim 2, wherein said evaluation circuit and said indicator and warning device are interconnected over separate circuits so that said evaluation circuit as well as said indicator and warning device are selectively switched to monitor the wear on said first member.

4. The arrangement, according to claim 1, wherein said temperature sensor on said first member is located on an adjacent support member to measure the temperature of said first member.

5. The arrangement, according to claim 1, wherein said temperature sensor is located on an adjacent support component to measure the temperature of said adjacent support member.

6. The arrangement, according to claim 5, wherein a number of temperature sensors are located around said first member so that the temperature signal corresponds to the arithmetic average of the signals of the individual temperature sensors.

7. The arrangement, according to claim 1, wherein a series of characteristic curves are stored in said evaluation circuit which represent the temperature of said first member and the temperature of said second member before and after the frictional contact and wear of said first and second members so that said evaluation circuit determines the value of the wear signal on the basis of the temperature signals fed to it.

8. The arrangement, according to claim 7, wherein:

(a) signals representing the friction work, which is performed during the frictional engagement, are fed to said evaluation circuit, and (b) said evaluation circuit is designed so that it is programmed with these parametric characteristics.

9. The arrangement, according to claim 1, wherein said first member and said second member form a wheel brake system of a motor vehicle, and wherein said first member is the brake lining which is supported on a carrier plate, and said second member is the associated brake drum.

10. The arrangement, according to claim 9, wherein the arrangement is a brake system of a motor vehicle which is designed as a fluid-operated wheel brake.

11. The arrangement, according to claim 10, wherein:

(a) a plurality of temperature sensors are disposed on at least two wheel brakes, and (b) said evaluation circuit includes a comparing and regulating circuit, which compares the temperature signals fed to it by the temperature sensors of the wheel brakes, with one another or with a command value derived from the series of characteristic curves, and includes appropriate pressure regulating valves which control the braking pressure of the various wheel brakes in the sense of an equalization of the temperature signals and thereby the wear of their brake linings with the command value.

12. The arrangement, according to claim 11, wherein the series of characteristic curves represent the partial weights of the various wheel brakes of the motor vehicle, and said evaluation circuit calculates and stores corrected values which are derived from the differences of the braking pressures being fed to the different wheel brakes based on the temperature signals received during and after one or more previous brake applications, and based on the load and velocity signals received during the previous brake application and when the respective brake is activated and causes the control of the braking pressures of the different wheel brakes using the corrected values for controlling the pressure control valves.

13. The arrangement, according to claim 12, wherein said evaluation circuit updates the corrected values on the basis of the temperature signals fed to it during or after the application of the brake, and on the basis of the load or velocity signals received during the application of the brake.

* * * * *